US008634067B2

(12) United States Patent
Perelman et al.

(10) Patent No.: US 8,634,067 B2
(45) Date of Patent: Jan. 21, 2014

(54) METHOD AND APPARATUS FOR DETECTING MICROSCOPIC OBJECTS

(75) Inventors: Lev T. Perelman, Brookline, MA (US); Juan G. Alvarez, La Coruña (ES); Mark D. Modell, Natick, MA (US)

(73) Assignee: Beth Israel Deaconess Medical Center, Inc., Boston, MA (US)

( * ) Notice: Subject to any disclaimer, the term of this patent is extended or adjusted under 35 U.S.C. 154(b) by 853 days.

(21) Appl. No.: 11/596,096

(22) PCT Filed: May 11, 2005

(86) PCT No.: PCT/US2005/016440
§ 371 (c)(1),
(2), (4) Date: Oct. 29, 2007

(87) PCT Pub. No.: WO2005/114291
PCT Pub. Date: Dec. 1, 2005

(65) Prior Publication Data
US 2011/0122487 A1 May 26, 2011

Related U.S. Application Data

(60) Provisional application No. 60/570,271, filed on May 12, 2004.

(51) Int. Cl.
*G01N 21/00* (2006.01)
(52) U.S. Cl.
USPC ............................................ 356/73; 356/337
(58) Field of Classification Search
USPC .................................. 356/301, 337
See application file for complete search history.

(56) References Cited

U.S. PATENT DOCUMENTS

| | | | | |
|---|---|---|---|---|
| 5,107,422 A * | 4/1992 | Kamentsky et al. | ......... | 382/133 |
| 5,345,306 A | 9/1994 | Ichimura et al. | | |
| 6,188,514 B1 * | 2/2001 | Saito et al. | ................... | 359/381 |
| 6,525,828 B1 * | 2/2003 | Grosskopf | ................... | 356/613 |
| 6,950,185 B1 | 9/2005 | Da Silva et al. | | |
| 2002/0036775 A1 | 3/2002 | Wolleschensky et al. | | |
| 2002/0163717 A1 * | 11/2002 | Lee | ................................ | 359/388 |
| 2003/0174324 A1 * | 9/2003 | Sandstrom | .................... | 356/317 |

OTHER PUBLICATIONS

International Search Report from corresponding International Application No. PCT/US2005/016440, May 11, 2005.
Appel Roland K, et al., *Ultrabroadband Collection and illumination optics for Raman and Photoluminescence Spectroscopy in the 200-700 nm Wave Band*, vol. 73, No. 10, Oct. 2002, pp. 3440-3448, XP012039401.

* cited by examiner

*Primary Examiner* — Tara S Pajoohi Gomez
(74) *Attorney, Agent, or Firm* — Wolf, Greenfield & Sacks, P.C.

(57) ABSTRACT

Apparatus including a broadband illumination source and a confocal optical system. The confocal optical system is configured and arranged to receive a portion of light projected onto an object by the broadband illumination source. The apparatus can include an illumination source, a confocal optical system, and at least one detector configured and arranged to receive angularly separated light corresponding to a confocal volume. There is also provided a light scattering spectroscopic device including a broadband illumination source, a two-dimensional detector, and a spectral separation device configured and arranged to receive scattered light from an object and to direct at least a portion of the scattered light onto the two-dimensional detector. The method and apparatus can combine confocal microscopy techniques with light scattering spectroscopy techniques to create a confocal light scattering spectroscopy (CLSS) system.

21 Claims, 3 Drawing Sheets

| MANUFACTURER | PART NUMBER | POWER | WAVELENGTH (nm) | PHASE |
|---|---|---|---|---|
| NICHIA | NDHV310ACA | 30mW | 408 | R33 |
| NICHIA | NDHB500APAE1 | 5mW | 440 | R33 |
| OMICRON LASERAGE | PGL-II-S-B | 25mW | 473 | R33 |
| OMICRON LASERAGE | MGL-S-A | 100mW | 532 | R33 |
| SANYO | DL-LS1035 | 35mW | 635 | R21 & R33 |
| APPLIED OPT | AOC 650-100 | 100mW | 650 | R33 |
| SHARP | GH06570A2C | 100mW | 660 | R21 & R33 |
| ROITHNER LASERTECHNIK | RLT67100G | 100mW | 670 | R33 |
| TOSHIBA | TOLD9160 | 40mW | 685 | R33 |
| APPLIED OPT | AOC 690-100 | 100mW | 690 | R21 & R33 |
| SONY | SLD301V-1 | 100mW | 785 | R21 & R33 |
| SONY | SLD301V-2 | 100mW | 810 | R21 & R33 |
| SONY | SLD301V-3 | 100mW | 830 | R21 & R33 |
| ROITHNER LASERTECHNIK | RTL85100G | 100mW | 850 | R33 |
| ROITHNER LASERTECHNIK | RLT8750G | 50mW | 870 | R21 & R33 |
| ROITHNER LASERTECHNIK | RLT9050G | 50mW | 900 | R21 & R33 |
| ROITHNER LASERTECHNIK | RLT92100 | 100mW | 920 | R21 & R33 |
| COHERENT | B1-940-35C-49-50-A | >100mW | 950 | R33 |
| ROITHNER LASERTECHNIK | RLT98100MG | 100mW | 980 | R21 & R33 |

FIG. 2

METHOD AND APPARATUS FOR DETECTING MICROSCOPIC OBJECTS

RELATED APPLICATIONS

The present application is a national stage application under 35 U.S.C. §371 of International Application Serial No. PCT/US2005/016440, filed on May 11, 2005, which claims the benefit under 35 U.S.C. §119(e) of U.S. Provisional Application Ser. No. 60/570,271, filed on May 12, 2004, both of which are hereby incorporated by reference in their entireties.

FIELD OF THE INVENTION

The present invention is related to methods and apparatus for detecting microscopic objects.

BACKGROUND OF THE INVENTION

There exist a number of methods of measuring microscopic objects, including confocal microscopy, two-photon fluorescence, light scattering spectroscopy (LSS), electron microscopy, and near-field optical microscopy, to name a few. Each method of measuring has limitations that restrict its effectiveness in one or more applications. For example, confocal microscopy is limited by diffraction (i.e., it is limited to detecting objects having dimensions greater than the Rayleigh limit). Two-photon fluorescence requires that the object to be measured include an endogenous fluorophore or have a fluorophore added; adding fluorophores may result in artifacts in data obtained from the object or in destruction of the object. LSS can be complicated if objects (or object features) to be measured are densely packed, such that light from the objects is scattered multiple times. Electron microscopy cannot be used in living cells. Near-field optical microscopy, while providing nearly limitless resolution (including objects having dimensions below the Rayleigh limit), has a very limited depth of field.

SUMMARY OF THE INVENTION

One aspect of the invention is directed to an apparatus comprising a broadband illumination source, and a confocal optical system configured and arranged to receive a portion of light projected onto an object by the broadband illumination source. The apparatus may optionally further comprise a spectral separation device coupled to the confocal optical system to receive and separate the portion of light.

Another aspect of the invention is directed to an apparatus comprising an illumination source; a confocal optical system configured and arranged to receive a portion of light projected onto an object by the illumination source, the confocal optical system defining a confocal volume on the object; and at least one detector configured and arranged to receive angularly separated light corresponding to the confocal volume. In some embodiments of the second aspect of the invention, the at least one detector comprises at least one detector configured and arranged to scan the angularly separated light corresponding to the confocal volume on the object. In some embodiments of the second aspect of the invention, the at least one detector optionally is comprised of a plurality of spatially separated detectors.

Another aspect of the invention is directed to an apparatus comprising an illumination source; at least one optical element configured and arranged to focus light from the illumination source onto an object; and a detector configured and arranged to receive a portion of the light scattered from the object over an angle greater than 10 degrees.

Another aspect of the invention is directed to a light scattering spectroscopic device to direct light onto an object and to receive scattered light from the object, comprising a broadband illumination source to provide the light directed onto the object; a two-dimensional detector; and a spectral separation device configured and arranged to receive the scattered light from the object and to direct at least a portion of the scattered light onto the two-dimensional detector, the spectral separation device spectrally separating the portion of the light.

Another aspect of the invention combines confocal microscopy techniques with light scattering spectroscopy techniques to create a confocal light scattering spectroscopy (CLSS) system, and thus to obtain a capability not otherwise available. In some embodiments for performing confocal light scattering spectroscopy, an object is illuminated with broadband illumination, light scattered from a confocal volume on the object is received, and light scattering spectroscopy is performed on at least a portion of the light scattered from within the confocal volume on the object.

BRIEF DESCRIPTION OF THE DRAWINGS

Illustrative, non-limiting embodiments of the present invention will be described by way of example with reference to the accompanying drawings, in which:

FIG. 2 is one exemplary set of discrete illumination sources suitable for use with the present invention.

DETAILED DESCRIPTION

Figure 1:
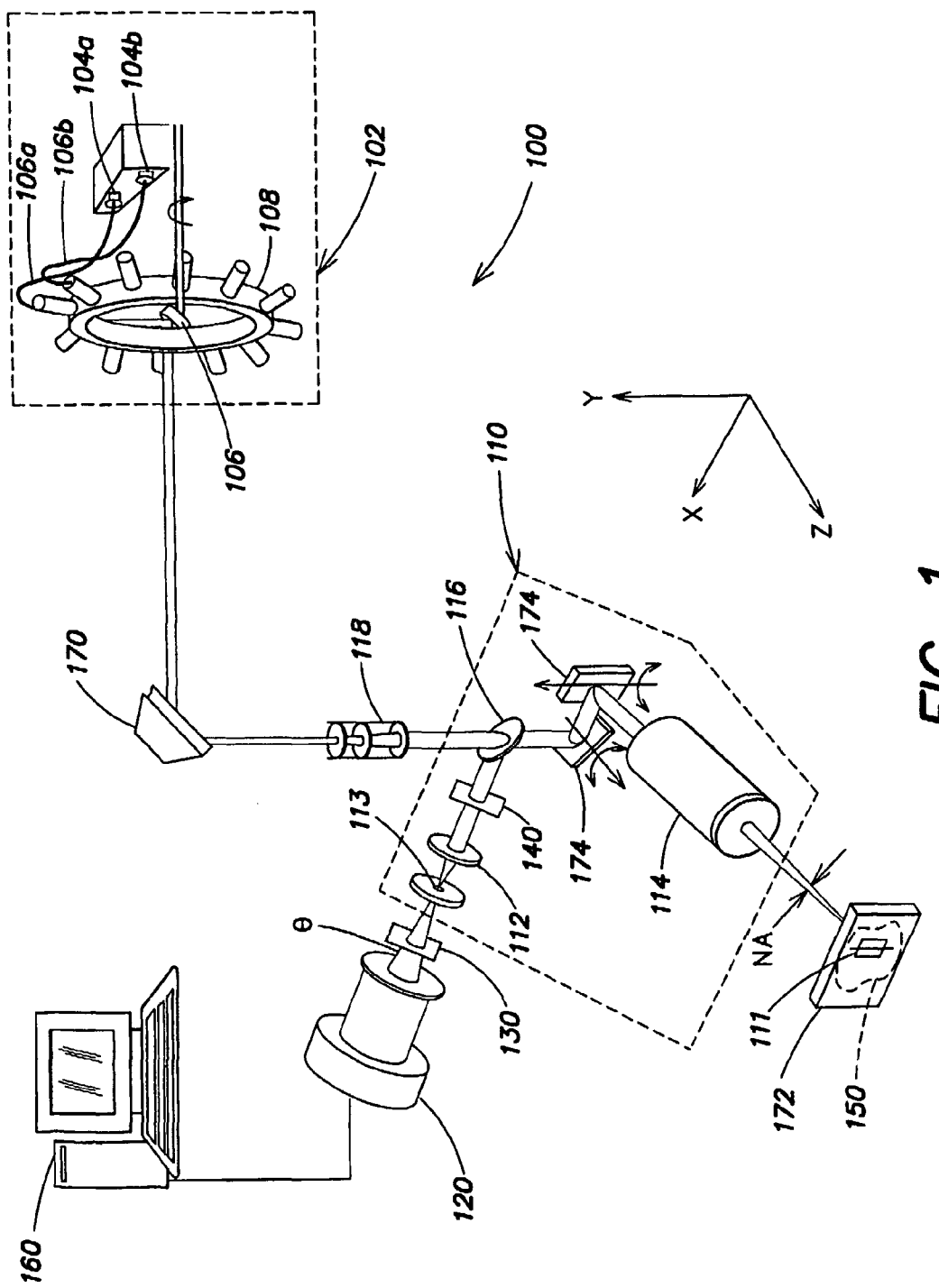
FIG. 1 is an exemplary embodiment of an apparatus according to at least some aspects of the present invention.

In accordance with one aspect of the present invention, improved methods and apparatus for detecting microscopic objects by detecting light are provided. Some embodiments are capable of detecting objects having dimensions less than 0.5 micrometers, and can do so non-invasively (i.e., without damage to the object(s) to be detected), other embodiments may detect objects having dimensions below the Rayleigh limit for the light detected. Some embodiments of the present invention can detect the size of an object to within 5-10 nanometers (nm). Some embodiments provide high accuracy detection in three dimension, i.e., in the x, y, and z dimensions.

One embodiment of the invention is directed to a confocal optical system used in combination with a broadband illumination source. According to this embodiment of the invention, light is projected onto an object by the broadband illumination source and the confocal optical system is configured and arranged to collect a portion of the light scattered from a confocal volume containing one or more objects. The light may be received by a detector and processed to characterize the one or more objects. This embodiment is in contrast to conventional confocal optical systems, which have used narrowband illumination.

Another embodiment of the invention is directed to a confocal optical system having an at least one detector to scan angularly separated light from a confocal volume of an object. According to this aspect of the invention, an illumination source (which may be broadband or narrowband) projects light onto the object and the confocal optical system is configured and arranged to receive and output a scattered portion of the light projected onto the object, such that the confocal optical system defines a confocal volume on the object, and the at least one detector is configured and arranged to receive angularly separated light from the confocal volume. The angularly separated light may be collected by a single detector that is scanned to receive the angularly separated light, or by a plurality of spatially separated detectors arranged to receive the angularly separated light. This aspect of the invention is in contrast to conventional confocal optical systems, which have integrated light scattered from a confocal volume of an object to form a single output.

Another embodiment of the invention is directed to a light scattering spectroscopic device in which light is collected over a large angle. According to this aspect of the invention, light is projected onto an object from an illumination source, and a detector is configured and arranged to receive a portion of the light scattered from a volume of the object, the receiving occurring over a large angle. In one embodiment, the large angle is greater than 10 degrees, and is preferably greater than 20 degrees, and more preferably greater than 70 degrees. In contrast, conventional light scattering spectroscopic devices have collected light over a relatively small angle (e.g., an angle limited by the numerical aperture of a fiber optic).

Another embodiment of the invention is directed to a light scattering spectroscopic device in which light from a broadband source is projected onto an object and light scattered from the object is processed by a spectral separation device and detected by a two-dimensional detector. The spectral separation device is configured and arranged to receive the scattered light from the object and to direct at least a portion of the scattered light onto the two-dimension detector. In contrast, conventional light scattering spectroscopic devices have directed narrowband illumination (e.g., laser light) onto an object and have used a one-dimensional detector to receive scattered, narrowband illumination.

FIG. 1 is an illustrative implementation of an apparatus 100 that incorporates each of the above-described aspects of the present invention. It is to be appreciated that aspects of the illustrated invention described below may be used separately; accordingly, the invention is not limited to embodiments where they are all used together. In the illustrated embodiment, an illumination source 102 projects light onto an object 150 via a confocal optical system 110, and a detector 120 receives a portion of the light reflected from the object 150. Each of these portions of the system is described in greater detail below.

Illumination source 102 may be any illumination source (also referred to herein simply as a "source") capable of generating broadband or, in some embodiments, narrowband illumination. The term "narrowband" is defined herein to mean a bandwidth of less than ten nanometers, and the term "broadband" means a bandwidth larger than ten nanometers. A narrowband illumination source may be any source capable of generating narrowband illumination. For example, a narrow band source may be comprised of a laser, light-emitting diode (LED) or a suitably filtered lamp.

A broadband source may be comprised of a single source providing broadband illumination (i.e., a lamp) or may be comprised of a plurality discrete narrowband illumination sources (e.g., multiple lasers or multiple LEDs) emitting in discrete wavelength bands that collectively are spread over a broadband. Any number of discrete narrowband sources may be used. One exemplary collection of a plurality of discrete illumination sources that can be used together to form a broadband source suitable for use with the present invention is given in FIG. 2. In an apparatus 100 having a broadband illumination source comprised of a plurality of discrete narrowband illumination sources, the discrete narrowband illumination sources may be used to illuminate object 150 simultaneously or sequentially. In one embodiment, the broadband source may be comprised of a super-continuum source.

In the illustrative implementation shown in FIG. 1, the illumination source 102 is a broadband illumination source using multiple discrete illumination sources 104a, 104b configured and arranged to emit radiation in a radially inward direction, such that a mirror 106 may be rotated to selectively illuminate object 150 with light from a selected one of illumination sources 104a, 104b. To achieve such a configuration, illumination sources 104a, 104b are optically coupled to a circular mount 108 through fiber optics 106a, 106b, respectively. As should be appreciated from the foregoing, the particular implementation of the broadband source illustrated in FIG. 1 is merely illustrative, as numerous other implementations of a broadband source are possible. Furthermore, although a broadband source provides advantages for some embodiments of the invention, other aspects of the invention are not limited in this aspect and can employ a narrowband source. For example, because the scattering characteristics of an object of a given size are dependent on the wavelength of the scattered light, the use of multiple wavelengths of a broadband source may allow an object (or feature of an object), which is below the Rayleigh limit of a particular wavelength of light, to be detected and characterized. However, while broadband sources offer advantages over narrowband sources, they typically are more expensive. For some applications with which the embodiments of the present invention may be employed, in some instances the cost increases associated with implementing a broadband source may not justify its use.

Confocal optical system 110 identifies a confocal volume 111 on the object 150 such that the light output from the confocal system 110 is from confocal volume 111. The illustrated confocal system includes an optical element 112 (e.g., a lens) and a pinhole 113 to specify confocal volume 111. The pinhole 113 may be 7 µm in diameter, or any appropriate size, as the invention is not limited in this respect. The confocal system further includes an optical system 114 that comprises at least one optical element configured and arranged to receive a portion of light projected onto object 150 by illumination source 102, i.e., the portion scattered from object 150. The size of the confocal volume 111 is selected to be any suitable size for receiving light from an object. In some embodiments, the size of confocal volume is preferably as small as possible, so as to restrict the objects (or object features) from which scattered light is received; however, the diffraction limit of the wavelength of light to be received limits the minimum size that can be achieved. For example, in one embodiment, light to be received has wavelengths in the range 635-980 nm, and the confocal volume 111 is on the order of 2-3 cubic micrometers. However, as those of ordinary skill in the art will understand, the selected confocal volume can be determined by a specific application for which the apparatus is used.

Optical system 114 may have any suitable object-side numerical aperture NA. In some embodiments, optical system 114 has a high numerical aperture to minimize the effects of diffraction on light received from object 150 and to receive scattered light from confocal volume 111 over a large angle, although the present invention is not limited to use of a high numerical aperture. The object-side numerical aperture NA may have any suitable value, preferably greater than approximately 0.2, and more preferably as large as possible. In some embodiments, optical system 114 is an immersion optical system (i.e., an immersion liquid is located between optical system 114 and object 150) to provide the large numerical aperture, although any suitable technique of achieving a high numerical aperture may be used.

In some embodiments, apparatus 100 comprises at least one optical element that is configured and arranged to focus light from illumination source 102 onto object 150. In the illustrated embodiment, a beam splitter 116 permits illumination to reach object 150 from illumination source 102 and directs a portion of the light scattered from object 150 to detector 120. Thus, the optical system 114 both focuses light from the illumination source 102 onto the object 150, and receives the scattered portion of the light from object 150. While the illustrated embodiment uses the same optical system (i.e., optical system 114) for both illumination of the object and receiving light from the object, arrangements where separate illumination and receiving optical systems are employed are within the scope of the invention. Optionally, apparatus 100 includes a spatial filter 118 to improve performance of the illumination of object 150.

Detector 120 is configured and arranged to receive light scattered from object 150. The light detected by detector 120 is preferably limited to light from illumination source 102 that is scattered from object 150.

In some embodiments, detector 120 receives light that is scattered by object 150 and collected over a large angle θ. The light received by detector 120 forms a scatter pattern. For example, detector 120 may be configured and arranged to receive a portion of the light scattered from the object 150 over an angle that is greater than 10 degrees, preferably greater than 20 degrees, and more preferably greater than 70 degrees.

Detector 120 may be configured and arranged to detect light that is angularly separated light corresponding to the confocal volume defined by the confocal system 110. Angular separation is specified by angle θ, which corresponds to numerical aperture NA. In the illustrated embodiment, detector 120 receives light from confocal volume 111 through confocal system 110. However, light may be received from a suitably constrained volume on object 150 using any suitable technique.

To collect angularly separated light, detector 120 may be comprised of at least one detector that is moved or scanned across the angularly separated light in a manner such that the at least one detector receives light from a plurality of angles (i.e., angles within angle θ). In such an arrangement, the light from different angles is obtained sequentially. Alternatively, detector 120 may comprise a plurality of spatially separated detectors. For example, the plurality of detectors may be arranged to form a one or two-dimensional detector 120 configured to receive light from a plurality of angles sequentially or simultaneously. The phrase "two-dimensional detector" is defined herein to be any detector comprising at least three detector elements that are arranged in a non-linear manner. One example of a two-dimensional detector is a two-dimensional array detector, such as a two-dimensional CCD.

Any suitable detector can be employed, such as a high-quantum efficiency silicon detector or other suitable high-quantum efficiency detector. In one embodiment, the detector provides a signal-to-noise ratio greater than 50:1 and a dynamic range of sixteen bits or more, but the invention is not limited in this respect. In some embodiments, detector 120 is synchronized with rotating mirror 106 such that light captured by detector 120 during one sampling period is from only one selected illumination source 104a, 104b.

In embodiments where the illumination source 102 is a broadband source, a spectral separation device 130 may be optically coupled to receive light from object 150 and separate broadband light scattered from object 150 according to wavelength, such that each wavelength or wavelength band forms a scatter pattern having an angular width equal to angle θ. For example, spectral separation device 130 may be optically coupled to the confocal optical system 110, such that spectral separation device 130 receives light from confocal system 110.

The spectral separation device 130 may be configured and arranged to receive light scattered from object 150 and to direct at least a portion of the scattered light onto detector 120. In one embodiment, detector 120 is a two-dimensional detector, and spectral separation device 130 spectrally separates the portion of the light and projects the light onto the two-dimensional detector such that a plurality of wavelengths or wavelength bands are projected onto spatially distinct portions of detector 120. Accordingly, the light may be processed separately for each of the plurality of wavelengths or wavelength bands. In embodiments of apparatus 100 in which detector 120 is a two-dimensional array detector, the spatially distinct portion may correspond to rows of detector elements comprising the array. Spectral separation may be complete (such that there is no overlap between adjacent wavelength bands) or may allow for partial overlap of adjacent wavelength bands.

Spectral separation device 130 can be any device that separates light according to wavelength. For example, spectral separation device 130 may be a diffraction grating, a prism, or other suitable device. While some embodiments of the invention having a broadband illumination source 102 may include a spectral separations device to spatially separate broadband light scattered from object 150 according to wavelength, this aspect of the invention is not limited in this regard, as the broadband light received from the object may be processed in numerous ways to detect and characterize the object, and need not be spatially separated.

In the embodiment shown, apparatus 100 includes a polarizer 140 to allow selective transmission of light of at least one polarization. Polarizer 140 may be any device capable of selectively transmitting light of a given polarization. In one embodiment, polarizer allows selective transmission of light in two perpendicular polarizations. For example, the polarizer may be comprised of an electronically controlled LCD retarder plate in combination with a linear polarizer.

In one embodiment, the polarizer 140 has a first arrangement in which it transmits only light polarized in a first orientation and detector 120 captures a first set of data corresponding to the first orientation, and a second arrangement in which it transmits light polarized in a second orientation and detector 120 captures a second set of data. A processor may calculate a pixel-by-pixel difference between the first set of data and the second set of data. For example, such a difference may be used to eliminate background signals associated with multiple scattering of light from a background object. It should be appreciated that the invention is not limited to employing a polarizer having two arrangements, as other types of polarizers can be employed. Furthermore, while the embodiment shown in FIG. 1 has a polarizer 140, the invention is not limited in this respect, as embodiments can be employed that do not include a polarizer.

Object 150 may be scanned using any suitable technique such that a plurality of confocal volumes can be detected from the object 150. For example, a scanner may comprise a suitable translation stage 172 on which object 150 may be mounted, or one or more scanning mirrors 174 to move confocal volume 111 across object 150. Apparatus according to the present invention need not have a scanner, as aspects of the present invention can be applied to devices where only a single confocal volume is to be detected on an object, or where the object to be detected is aligned manually.

As one of ordinary skill in the art will understand, apparatus 100 may include one or more beam folding mirrors 170 to provide flexibility in the configuration of the apparatus components, e.g., to fit the apparatus in a selected volume or housing.

A processor 160 may be included to process one or more scan patterns from detector 120 (also referred to herein as detector outputs), and may comprise any suitable processor. For example, processor 160 may be a conventional personal computer, a digital signal processor or any other suitable computation device. Processor 160 may detect and characterize object 150 using the detector output. For example, processor may manipulate the data to determine one or more characteristics of one or more objects 150.

A scatter pattern may be processed using any known method of processing, as the present invention is not limited to any particular processing technique According to one embodiment of the invention, scatter pattern is processed using a conventional Mie model. For example, such processing may occur in accordance with the teachings of Draine B. T. and Flatau P. J., entitled "Discrete Dipole Approximation for Scattering Calculation," J. Opt. Soc. Am. A 11 1491-1499 (1994), which describes a method of implementing a discrete dipole approximation and numerical method of computation. Such a model may be used to analyze a scatter pattern detected by detector 120. For example, analysis may be achieved by performing calculations on a scatter pattern from detector 120 to determine characteristics of an object 150.

Alternatively, calculations can be first performed on models of known objects to form a library of expected outputs from detector 120 (i.e., the library forms a look-up table). The known objects may have any known characteristics. For example, characteristics may include size, shape, and refractive indices of objects. Accordingly, processor 160 may be provided with such a library, and a scatter pattern can be compared to the patterns in the library to determine characteristics of an object 150.

In one embodiment, a library is formed experimentally by capturing outputs from detector 120 for objects having known characteristics. According to this embodiment, subsequent scan data (i.e., from objects having unknown characteristics) can be compared to the library to determine characteristics of the objects having unknown characteristics.

Optionally, outputs from detector 120 can be compared to items in a library using a $\chi^2$ analysis. As one of ordinary skill in the art will understand, a $\chi^2$ analysis is performed by generating a sum of the difference between a detector output and an entry in the library. The item in the library for which the sum is the lowest is determined to be a match.

Apparatus 100 may be operated in any suitable manner. According to one example of an operation protocol, information corresponding to a plurality of confocal volumes is collected by detector 120 and stored in a memory (not shown). For example, the memory may be in processor 160.

Information collected for each confocal volume 111 may include two outputs for each of the one or more wavelengths of illumination from source 102, the two outputs corresponding to two perpendicular polarizations for each of the one or more wavelengths of illumination.

For each wavelength, information corresponding to the perpendicular polarizations is subtracted (e.g., using frame grabber software), and the image is digitized and stored in a matrix. The matrix may include the two polarized outputs and an output corresponding to the difference between the two polarized outputs. One or more of the outputs forming the matrix may be compared to one or more items in a library of expected outputs.

By performing a $\chi^2$ analysis as described above, one or more characteristics of an object may be determined. Exemplary characteristics include: size (or average size if there is more than one object in the confocal volume), the statistical distribution of the size of the objects in the confocal volume (if there is more than one object in the confocal volume), average index of refraction of the objects in a confocal volume, and the elongation of the object(s). The above list is merely illustrative, as any known characteristic affecting the scattering of light may be determined.

Once characteristics of a plurality of confocal volumes have been determined, the results can be presented using any suitable display technique. For example, multiple characteristics can be displayed using pseudo-color techniques.

Additionally, once two or more of the characteristics have been determined, a second analysis may be performed by combining known characteristics to further characterize an object. For example, density may be calculated from an average size and a refractive index using known techniques.

The above characteristics may be used individually or in combination to draw conclusions about object(s) in a confocal volume. For example, if the size of a given object is greater than a specified number, a specific conclusion may be made. For example, the size of cells or nuclei in cells may be used to determine the existence of cancer or cancer precursors. Alternatively, a plurality of characteristics may be weighted such that a given conclusion will be made if the characteristics add up to a given weighted sum. Also, data from multiple adjacent or distant confocal volumes can be combined to draw a conclusion. For example, proximate volumes may be characterized to identify and count metaphasic chromosomes in an intact amniotic fluid cell.

The above-described processing techniques are merely illustrative, as the invention is not limited to processing techniques described, or to any particular processing techniques.

Figure 3:
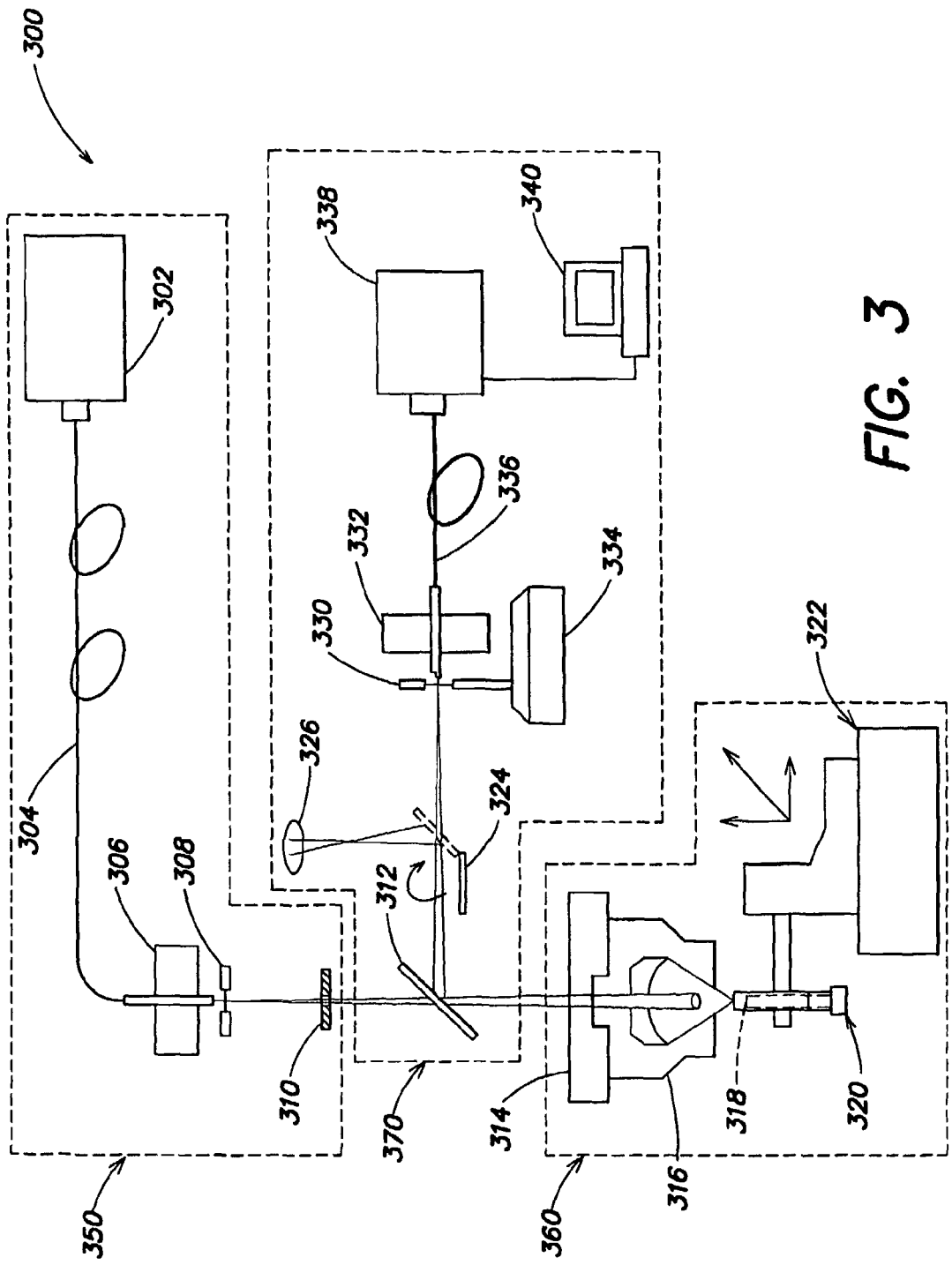
FIG. 3 is another embodiment of an apparatus according to at least some aspects of the present invention.

FIG. 3 is an embodiment of a confocal light scattering spectroscopy (CLSS) microscope 300 according to at least some aspects of the present invention. The CLSS microscope 300 comprises a light delivery subsystem 350, a light scattering/sampling subsystem 360, and a light collection/detection subsystem 370. The CLLS microscope 300 can comprise pinholes 318 and 330, positioned in the light delivery and collection subsystems, 350 and 370, which are optically conjugate relative to the focal plane of a reflective objective 316. In some embodiments, the pinholes 318 and 330 provide confocal optical sampling.

CLLS microscope 300 comprises a broadband illumination source 302 that generates light which is delivered through a delivery optical fiber 304 mounted on a fiber chuck and fiber positioner. The fiber chuck can enable precise alignment of the fiber 304 relative to the delivery pinhole 308 via the use of an alignment laser (not shown). In one embodiment, the delivery pinhole 308 diameter is 30 μm. In one embodiment, the delivery optical fiber has a diameter of 200 μm and a numerical aperture (NA) of 0.22.

CLLS microscope 300 comprises an iris diaphragm 310, positioned downstream of the delivery pinhole 308. The iris diaphragm 310 can be used to limit the diameter of the light beam to match the acceptance angle of the reflective objective 316 positioned further downstream. In one embodiment, the acceptance angle of the reflective objective 316 is about 20 mrads.

CLLS microscope 300 comprises a beam splitter 312 positioned downstream from the iris diaphragm 310. The reflective objective 316 is positioned downstream from the beam splitter 312. In one embodiment, the reflective objective 316 is an achromatic reflective objective. In one embodiment, the reflective objective 316 possess a magnification of 36× and a NA of 0.5. In one embodiment, the reflective objective 316 is a reflective objective offered by Ealing Catalog Inc. under catalog number 25-0522. In one embodiment, the reflective objective 316 is mounted on an objective mount 314.

In one embodiment, achromatic components are used in the CLSS microscope 300 since a broadband source 302 possessing multiple wavelengths is used as a light source. The achromatic components can provide good multi-wavelength confocal performance and accurate spectroscopic intensity information. For example, the use of the reflective objective 316, which does not possess refractive elements, does not contribute to chromatic aberrations.

Light leaving the reflective objective 316 impinges upon a sample 318 mounted on a sample holder 320 and forms a confocal volume on the sample 318. In one embodiment, the sample holder is mounted on a scanning stage 322, that can allow for the sample holder 320 to be moved in any number of dimensions. In one embodiment, the scanning stage 322 can move the sample holder 320 in three dimensions (x, y, and z directions). In one embodiment, the scanning stage 322 can rotate the sample holder 320 in one or more angular directions.

Light backscattered from the sample 318 can be collected with the reflective objective 316 and reflected to the beam splitter 312. The beam splitter 312 can in turn reflect the scattered light toward a collection confocal pinhole 330. In one embodiment, the collection confocal pinhole 330 has a diameter of 30 µm.

A flip mirror 324 may also be located between the beam splitter 312 and the collection confocal pinhole 330. The flip mirror 324 can be positioned in the beam path so as to redirect light to an eyepiece 326. The flip mirror 324 can allow for the visual observation of the sample 318, similar to a conventional high-resolution microscope.

The collection confocal pinhole 330 can block light coming from regions above and below the focal plane, thereby allowing only light scattered from a small focal volume to be transmitted through the collection confocal pinhole 330. Light passing through the collection confocal pinhole 330 can be collected by a collection optical fiber 336 mounted onto a fiber chuck and positioner 332. The collection confocal pinhole 330 and the fiber chuck and positioner 332 can be mounted on a translation stage 334. In one embodiment, the collection optical fiber 336 has a diameter of 100 µm and a NA of 0.11.

The collection optical fiber 336 is coupled to a detector 338 which is coupled to a computer 340 that can analyze and display image data. In one embodiment, the detector 338 is a detector that can provide spectroscopic information. The spectroscopic information may comprise light intensity versus wavelength. In one embodiment, the detector 338 is a thermo-electrically-cooled detector offered by Andor Technology under product number DU-434-FI.

In one embodiment, the CLSS microscope 300 can collect both spatial (i.e., imaging) and spectroscopic (i.e., wavelength dependent) information from the sample 318.

In one embodiment, an image of a portion of the sample 318 is created by scanning the confocal volume over a portion of the sample 318. In one embodiment, the scanning of the confocal volume over the sample 318 may be achieved by moving the sample holder 320 using the scanning stage 322. In one embodiment, the scanning of the confocal volume may be achieved using scanning mirrors (not shown) that can move the confocal volume relative to the sample 318.

Light intensity may be collected using the detector 338 for each location of the confocal volume on the sample 318, and light intensity information may be sent to the computer 340 which can construct an image of the portion of the sample 318 by using light intensity from the plurality of confocal volumes. In some embodiments, the detector 338 transmits spectroscopic light intensity information to the computer 340, thereby allowing the computer 340 to create images for a plurality of wavelengths.

In one embodiment, the CLSS microscope 300 can collect time-dependent information from the sample 318. In one embodiment, the confocal volume on the sample 318 is kept fixed and time-dependent spectral information is collected. The time-dependent spectral information may comprise light intensity scattered from the confocal volume on the sample 318 as a function of wavelength.

In some embodiments, the sample 318 may comprise structures possessing sizes of less than 0.5 micrometers. In further embodiments, the sample 318 may comprise biological structures possessing sizes of less than 0.5 micrometers.

Applications for the above-described embodiments of the present invention include analyzing any microscopic object or feature, including for some embodiments objects or features that are below the Rayleigh limit. An example field of use is biological applications where, due to the ability to resolve objects below the Rayleigh limit, the present invention may be applied to characterize cell organelles or chromosomes, and in particular, by suitable configuration and selection of components, real time information about morphological, biochemical and physical properties may be obtained.

Additional biological applications include the non-invasive study of embryo development by obtaining information concerning the number of chromosomes present in condensed cells (i.e., cells in metaphase), determination of chromatin fragmentation in somatic and germ cells, drug screening and monitoring the toxic effects of drugs and chemicals for effects on embryo development, measuring the effects of physical factors (e.g., sound waves, light, radiation, gravity, pressure, temperature, $pO^2$ to name a few) on embryo development, determining early pre-cancerous changes on a sub-cellular level, and studying apoptosis. Additionally, aspects of the invention may be used to monitor subcellular changes in real time both outside of the body and in epithelial tissues in the body, leading to an understanding of the processes by which cells change when they become cancerous. Another application is the monitoring of cell function and cellular response to applications of various drugs. The above-discussed biological applications are merely illustrative, as embodiments of the present invention can be used for other biological applications, as well as non-biological applications in which microscopic objects are to be characterized. For example, applications may be found in material science, physics, chemistry, etc.

Having thus described the inventive concepts and a number of exemplary embodiments, it will be apparent to those skilled in the art that the invention may be implemented in various ways, and that modifications and improvements will readily occur to such persons. Thus, the examples given are not intended to be limiting.

What is claimed:

1. An apparatus comprising:
a broadband illumination source capable of providing light to illuminate at least a portion of an object;

a confocal optical system configured and arranged to receive a portion of light projected onto the object by the broadband illumination source, wherein the confocal optical system defines a confocal volume on the object;

a spectral separation device coupled to the confocal optical system, the spectral separation device configured to separate at least a portion of the light received by the confocal optical system from the object into a plurality of spectra based on wavelength; and at least one detector arranged to receive at least a portion of the light received by the confocal optical system and separated by the spectral separation device, the at least one detector configured to produce output comprising spectroscopic information about a scatter pattern of the light scattered from the object, received by the confocal optical system, separated by the spectral separation device and received by the at least one detector.

2. The apparatus of claim 1, further comprising:

at least one processor to receive the output from the at least one detector and configured to spectroscopically determine scatter pattern information to determine at least one characteristic of the object based on the output.

3. The apparatus of claim 2, wherein the at least one detector includes a two-dimensional detector, and wherein the spectral separation device provides each of the plurality of spectra to respective spatially distinct portions of the two-dimensional detector.

4. The apparatus of claim 1, wherein the broadband illumination source comprises a plurality of narrowband illumination sources.

5. The apparatus of claim 1, wherein the confocal optical system comprises at least one pinhole that defines the confocal volume on the object.

6. The apparatus of claim 5, wherein the confocal optical system comprises a beam splitter configured and arranged to direct light from the broadband illumination source to the object, and direct light from the object to the at least one pinhole.

7. The apparatus of claim 6, wherein the at least one pinhole is configured and arranged to direct light to the spectral separation device.

8. The apparatus of claim 1, further comprising a scanner that enables scanning of the confocal volume on the object.

9. The apparatus of claim 8, wherein the scanner comprises a translation stage that is configured and arranged to move the object.

10. The apparatus of claim 8, wherein the scanner comprises at least one scanning minor that is configured and arranged to move the confocal volume over the object.

11. The apparatus of claim 1, wherein the at least one detector includes a two-dimensional detector, and wherein the spectral separation device is configured and arranged to direct at least a portion of the light received by the confocal optical system scattered from the object onto the two-dimensional detector, wherein the two-dimensional detector is configured to produce the output comprising spectroscopic information about a scatter pattern of the light scattered from the object.

12. The apparatus of claim 11, wherein the two-dimensional detector comprises a two-dimensional charge coupled device array.

13. The apparatus of claim 11, wherein the spectral separation device provides each of the plurality of spectra to respective spatially distinct portions of the two-dimensional detector.

14. The apparatus of claim 11 further comprising at least one processor to receive the output from the at least one detector and configured to spectroscopically determine scatter pattern information to determine at least one characteristic of the object based on the output.

15. An apparatus comprising:

an illumination source capable of providing light to illuminate at least a portion of an object;

a confocal optical system configured and arranged to receive light from the illumination source and to project a portion of the light received from the illumination source onto a confocal volume defined on the object, the confocal optical system comprising:

at least one optical element to focus light from the illumination source and to focus light scattered from the object; and an aperture arranged to allow light from the illumination source focused by the at least one optical element to pass to the confocal volume defined on the object, and positioned to receive light scattered from the object, and selected to have a numerical aperture such that light received by the aperture includes at least some light scattered at angles greater than 10 degrees; and at least one detector configured and arranged to receive at least some of the light scattered from the object received by the aperture and focused by the at least one optical element, the at least some light received by the at least one detector corresponding to the confocal volume on the object.

16. The apparatus of claim 15, wherein the at least one detector comprises at least one detector configured and arranged to scan the angularly separated light corresponding to the confocal volume on the object.

17. The apparatus of claim 15, wherein the at least one detector comprises a plurality of spatially separated detectors.

18. The apparatus of claim 15, wherein the illumination source comprises a broadband illumination source.

19. The apparatus of claim 15, wherein the illumination source comprises a narrowband illumination source.

20. The apparatus of claim 15, wherein the angle is greater than 20 degrees.

21. The apparatus of claim 15, wherein the angle is greater than 70 degrees.

* * * * *